United States Patent [19]

Kerfoot et al.

[11] 3,952,803

[45] Apr. 27, 1976

[54] OIL RECOVERY METHOD USING OVERBASED WATERFLOOD ADDITIVE CONTAINING SULFONATES DERIVED FROM ALKYLATION REACTION PRODUCTS

[75] Inventors: Oliver C. Kerfoot; Charles R. Clark, both of Ponca City, Okla.; Carl D. Kennedy, San Diego, Calif.

[73] Assignee: Continental Oil Company, Ponca City, Okla.

[22] Filed: Jan. 8, 1975

[21] Appl. No.: 539,218

Related U.S. Application Data

[63] Continuation of Ser. No. 388,689, Aug. 15, 1973, abandoned.

[52] U.S. Cl. ............................. 166/270; 166/274; 166/273; 252/8.55 D
[51] Int. Cl.² ........................................ E21B 43/22
[58] Field of Search ................................................
166/273–275, 270, 305 R; 252/8.55 D

[56] References Cited
UNITED STATES PATENTS

| | | | |
|---|---|---|---|
| 3,057,896 | 10/1962 | Schlicht et al. | 260/504 R X |
| 3,111,984 | 11/1963 | Reisberg | 116/270 |
| 3,302,713 | 2/1967 | Ahearn et al. | 166/274 |
| 3,373,808 | 3/1968 | Patton | 166/275 |
| 3,392,782 | 7/1968 | Ferrell et al. | 166/270 X |
| 3,398,791 | 8/1968 | Hurd | 166/270 |
| 3,436,347 | 4/1969 | Otto et al. | 252/33 X |
| 3,493,051 | 2/1970 | Gogarty | 166/275 X |
| 3,591,498 | 7/1971 | Benbury et al. | 252/33 |
| 3,799,263 | 3/1974 | Prillieux et al. | 166/275 |
| 3,804,171 | 4/1974 | Krehbiel et al. | 166/274 |

*Primary Examiner*—Stephen J. Novosad
*Attorney, Agent, or Firm*—F. Lindsey Scott

[57] ABSTRACT

An improved anionic overbased waterflood additive comprises a base component, a first sulfonate component derived from an alkylation reaction product employing a branched-chain alkene as the alkylating agent, and a second sulfonate component derived from an alkylation reaction product employing a partially chlorinated normal alkane as the alkylating agent, wherein the base component is present in the weight ratio range of 3/100 to 300/100, base component to total sulfonate, and wherein the weight ratio of the first sulfonate component to the second sulfonate component is in the range of 1/9 to 9/1. The overbased waterflood additive may be formed prior to injection into a petroliferous formation or may be formed in situ by first injecting the total sulfonate followed by the base component.

4 Claims, No Drawings

OIL RECOVERY METHOD USING OVERBASED WATERFLOOD ADDITIVE CONTAINING SULFONATES DERIVED FROM ALKYLATION REACTION PRODUCTS

This is a continuation of application Ser No. 388,689, filed Aug. 15, 1973, now abandoned.

In one aspect, this invention relates to an improved overbased anionic waterflood additive. In another aspect, this invention relates to a process for the recovery of hydrocarbons from a petroliferous formation involving injecting into the petroliferous formation an improved overbased anionic waterflood additive and water.

A large percentage of the oil in petroliferous formations is held within the rock of the formation by the surface forces between the formation rock, the oil therein, and the aqueous liquid in the formation. As a result, a substantial portion of such oil usually remains in the formation even when the wells traversing the formation are no longer productive. Various secondary recovery techniques, such as thermal recovery, gas injection, and waterflooding having been suggested for the recovery of this fixed oil which remains in the formation after primary recovery methods are no longer feasible to produce additional oil. As a secondary recovery technique, waterflooding is quite commonly employed, and a multiplicity of methods have been suggested for improving efficiency and economy of the oil recovery by the practice of waterflooding. Such methods frequently include incorporation of a water-soluble surfactant in the waterflood liquid which is injected into the petroliferous formation. A number of typical surfactants have been proposed for this purpose, including alkyl pyridium salts, sodium lauryl sulfates, certain sulfonates, glycosides, sodium oleate, quaternary ammonium salts, and the like. The use of such surfactants has arisen because it is widely recognized that a low interfacial tension between the surfactant flood water and the reservoir crude oil is beneficial to the improvement of recovery efficiencies and feasibilities.

Recently, it has been proposed that nonionic surfactant solutions, such as a polyoxyethylene-polyoxypropylene copolymer containing solution be injected into the formation through a first of two well bores to thereby displace the hydrocarbons in the formation toward a second well bore. The nonionic surfactant flood is then followed by an injection of a slug of aqueous caustic mixture into the formation through the first well bore to displace the hydrocarbon of the formation and the injected surfactant toward the second well bore. The caustic slug has a basicity of at least 1.5 pH levels greater than that of the native formation waters. However, use of a nonionic surfactant has not fully met the needs of the industry as a desirable waterflood surfactant composition, and new compositions are constantly being sought which will allow recovery of the residual oil remaining in the formation following primary oil recovery operations. Also, the surfactant materials of the prior art have on occasion suffered from lack of availability or excessive costs, and thus have not entirely satisfied the long-felt need of the industry for a feasible method to recover oil remaining in subterranean petroliferous formations.

According to the present invention, an improved anionic overbased waterflood additive has been found which comprises a base component, a first sulfonate component derived from an alkylation reaction product employing a branched-chain alkene as the alkylating agent, and a second sulfonate component derived from an alkylation reaction product employing a partially chlorinated normal alkane as the alkylating agent, wherein the base component is present in the weight ratio range of 3/100 to 300/100, base component to total sulfonate, and wherein the weight ratio of the first sulfonate component to the second sulfonate component is in the range of 1/9 to 9/1. The overbased waterflood additive may be formed prior to injection into a petroliferous formation or may be formed in situ by first injecting the total sulfonate followed by the base component.

The First Sulfonate Component

The first sulfonate component of the improved waterflood additive is derived from an alkylation reaction product employing a branched-chain alkene as the alkylating agent. In general, the alkylation reaction product is formed by alkylating an aromatic hydrocarbon with a branched-chain alkene having about 10 to 35 carbon atoms. This alkylation reaction product, or fraction thereof, is then sulfonated and neutralized to obtain the first sulfonate component of the waterflood additive.

The branched-chain alkene can be any branched-chain alkene having 10 to 35 carbon atoms such as mono-olefins produced from an Oxo process, through a Ziegler growth process, or other known process. A preferred branched-chain alkene is a propylene tetramer dimerization reaction product. This propylene tetramer dimerization product is described in U.S. Pat. No. 3,410,925.

The aromatic hydrocarbon is defined by the formula

wherein Ar is a benzene or naphthalene nucleus having a valence of $n$; each R is methyl or ethyl; and $n$ is 0, 1 or 2. Some examples of suitable aromatic hydrocarbons are benzene, naphthalene, toluene, xylenes, ethylbenzene, diethylbenzenes, diethylnaphthalenes, etc. Benzene is particularly preferred.

The alkylation reaction may be carried out in accordance with procedures known in the art. In general, reactant mol ratios of the aromatic hydrocarbon to the branch branched-chain alkene may range from about 1/1 to 25/1, with 5/1 to 10/1 being preferred. Temperatures of about 10°C to 100°C may be employed, preferably 20°C to 50°C. Typical Friedel-Crafts alkylation catalysts may be used, such as aluminum chloride, and in amounts of about 1 to 10 percent by weight based on the branched-chain alkene.

Both continuous and batch reaction techniques may be used. Effective contact time between catalyzed reactants is desirably between 10 and 60 minutes. As known in the art, the precise contact time depends on many factors such as type and amount of catalyst, the particular reactants, the reaction temperature, and the like.

The resulting alkylation reaction product is charged to a separator where a sludge containing the catalyst settles out and is readily removed. This sludge may conveniently be recycled back to the alkylation reaction to reduce the amount of fresh catalyst that would be required. Generally, the recycled sludge should not exceed an amount equal to the alkene charge.

After sludge removal, the crude alkylation reaction product is washed and excess, aromatic hydrocarbon and any unreacted alkenes are removed. The resulting alkylation reaction product can then be sulfonated and neutralized as such in accordance with known procedures to form the first sulfonate component of the waterflood. It is also possible to fractionally distill the alkylation reaction product into any desired molecular weight range and then sulfonate and neutralize that fraction for use as the first sulfonate component. A further variation contemplated is to recombine any selected fractions desired followed by sulfonation and neutralization.

According to a preferred embodiment, the first sulfonate component is derived by alkylating benzene with propylene tetramer dimerization product wherein the dimer has 20 to 30 carbon atoms per molecule (employing a ratio of benzene to dimer in the range of 5/1 to 10/1), then fractionally distilling a first product cut corresponding to a molecular weight of about 200 to 275 and a second product cut corresponding to a molecular weight of about 300 to 475, then combining about 0.5 to 2.0 parts by weight of the first cut with each part by weight of the second cut, then sulfonating and neutralizing the resulting mixture.

The Second Sulfonate Component

The second sulfonate component of the improved waterflood additive is derived from an alkylation reaction product employing partially chlorinated normal alkanes having about 10 to 18 carbon atoms per molecule as the alkylation agent. In general, the alkylation reaction product is formed by alkylating an aromatic hydrocarbon, such as described in connection with the first sulfonate component, with the partially chlorinated normal alkane under conventional alkylation conditions. This alkylation reaction product, or fraction thereof, is then sulfonated and neutralized to obtain the second sulfonate component of the waterflood additive.

In preparing the alkylation reaction product, a normal alkane having 10 to 18 carbon atoms or mixtures thereof are partially chlorinated to the extend that the chlorination reaction product, which includes both mono-chlorinated and poly-chlorinated derivatives as well as unchlorinated alkanes, contains about 2 to 15 wt % chlorine, preferably about 3 to 6 wt % chlorine. The normal alkanes may be provided from refinery streams using such well-known separation techniques as urea adduction or molecular sieves.

The chlorination reaction product may be used as is to alkylate the aromatic hydrocarbon or the chlorinated alkane alkanes may first be separated from the unchlorinated alkanes and then used for the alkylation. In either event, the alkylation is conducted in the same manner as described with the first sulfonate component to produce an alkylation reaction product which, after removal of sludge and unreacted materials, may be sulfonated and neutralized to form the second sulfonate component of the waterflood additive. As with the first sulfonate component, the second sulfonate component may also be formed by fractionally distilling the alkylation reaction product, which is a complex mixture, to any desired molecular weight range followed by sulfonation and neutralization or it may be formed from mixtures of such fractions as desired.

According to a preferred embodiment, the second sulfonate component is derived by distillatively separating an essentially monoalkylbenzene derivative fraction and recovering the higher molecular weight fraction for sulfonation and neutralization. As is known in the art the temperature at which such fractional distillation cut is made will depend on the aromatic hydrocarbon and normal alkanes employed in the overall preparation. However, where the aromatic hydrocarbon is benzene the distillation cut will be made in the range of 180°C to 240°C at 10 mm Hg depending on the chain length of the normal alkane. Thus, where the normal alkane is a mixture of $C_{10}$–$C_{12}$ normal alkanes the distillation cut is made at about 200°C at 10 mm Hg whereas when the normal alkane is a mixture of $C_{12}$–$C_{14}$ normal alkanes the distillation cut will be at about 210°C to 215°C at 10 mm Hg. The bottoms fractions from these cuts may then be sulfonated and neutralized to form the second sulfonate component.

The Base Component

The base component employed in the waterflood additive is selected from the alkali metal hydroxides, ammonium hydroxides and the alkali metal carbonates. Illustrative of the base component are NaOH, KOH, LiOH, $Na_2CO_3$, $NaHCO_3$, $NH_4OH$, $K_2CO_3$, and the like. NaOH or $NH_4OH$ are preferred. While not essential, it is also preferred to employ a base component which is the same as the base employed in neutralization of the sulfonated alkylation reaction products forming the first and second sulfonate components.

The Overbased Anionic Waterflood Additive

As mentioned previously, the overbased anionic waterflood additive comprises the base component, the first sulfonate component and the second sulfonate component, wherein the base component is present in a weight ratio of 3/100 to 300/100, base component to total sulfonate, preferably about 20/100 to 100/100, and wherein the weight ratio of the first sulfonate component to the second sulfonate component is in the range of 1/9 to 9/1, preferably 1/1 to 1/4.

It is essential that the base component be present in quantities of at least 3 parts by weight per 100 parts by weight of the combined sulfonate components in order to provide desirable results in terms of hydrocarbon recovery. On the other hand, quantities in excess of about 3 parts by weight per part by weight of the sulfonate components will encounter problems of high viscosities and thus pose difficulties in materials handling.

The additive may be formed by simply mixing each of the components. Alternatively, the non-neutralized but sulfonated alkylation reaction products representing the first and second sulfonate components may be mixed and sufficient base added to neutralize both sulfonated reaction products and at the same time provide the overbasing base component. It is also possible to form the waterflood additive in situ in the petroliferous formation by injecting the first and second sulfonate components followed by the base component.

Other high molecular weight natural or synthetically derived sulfonates can be added to the overbased anionic waterflood additives of the invention if desired. Such high molecular weight sulfonates include those which are water-soluble and oil-soluble, generally having molecular weights in the range of about 400 to about 600. When adding the other high molecular weight oil-soluble sulfonates to the anionic waterflood additives of the invention, about 0.2 to 1.0, preferably 0.2 to 0.4, parts by weight of high molecular weight oil-soluble sulfonate for each part by weight of the combined first and second sulfonate components be employed. When such high molecular weight sulfonates are employed they should be derived by neutralization with the same base as the sulfonate components of the additive. In addition, the overbased anionic waterflood additive to which the high molecular weight sulfonates are added should also have a sufficient additional amount of the base component to provide for an overall weight ratio in the range of 3/100 to 300/100 of base component to the combined first and second sulfonate components plus the high molecular weight sulfonate.

A preferred overbased anionic waterflood additive comprises a mixture of sodium hydroxide; a first sulfonate component derived by alkylating benzene with propylene tetramer dimer and distillatively separating those fractions from the total alkylation reaction product having molecular weights in the range of about 200 to 275 and molecular weights in the range of about 300 to 475 followed by sulfonation of a combination of these two fractions in a weight ratio of 6/4 to 1/9 and neutralization with sodium hydroxide; and a second sulfonation component derived by alkylating benzene with a partially chlorinated mixture of $C_{10}$-$C_{12}$ alkanes and distillatively removing the volatiles at temperatures of about 180°C to 240°C at 10 mm Hg to recover the bottoms fraction which is then sulfonated and neutralized with sodium hydroxide; wherein the sodium hydroxide component is present in a weight ratio of about 3/100 to 300/100, sodium hydroxide to total sulfonate components; and wherein the weight ratio of the first sulfonate component to the second sulfonate component is in the range of 1/1 to 1/4.

Use of the Overbased Anionic Waterflood Additive

The overbased anionic waterflood additives of the invention can be employed in any conventional manner of waterflooding with surfactants. In general, the overbased anionic waterflood additive (or the combined sulfonate components depending on the technique used) is injected into a well or petroliferous formation as an aqueous solution containing about 0.5 to about 25 wt. % of the combined sulfonate components, preferably about 3 to about 15 wt. %. By way of example, two methods are described below which are illustrative.

One suitable method involves injecting an aqueous slug containing about 0.5 to about 25 wt. % of the combined sulfonate components through a well bore into a petroliferous subterranean formation from which additional hydrocarbon is to be recovered. After the sulfonate slug has been dispersed into the formation, an effective amount of an aqueous base component in the form of a second slug is introduced into the formation to form an aqueous mixture in situ in the subterranean formation containing the overbased anionic waterflood additive. When employing such a method, a sufficient amount of the base component-containing mixture must be injected into the formation to assure that the waterflood additive will be overbased such that the weight ratio of base to combined sulfonate components is about 3/100 to about 300/100.

A second technique for employing the overbased anionic waterflood additive involves preformation of the entire additive, admixing with water to form a mixture containing about 0.5 to 25 wt. % of the combined sulfonate components, and injecting the aqueous mixture directly into the petroliferous formation at a single slug. When employing this procedure, the same limitations as to the overbasing ratio apply as described hereinbefore.

While the overbased anionic waterflood additive demonstrates remarkable effectiveness, additional tertiary oil can be recovered from the subterranean petroliferous formation by injecting a further amount of an aqueous mixture containing a base component into the formation which has previously been contacted with the overbased anionic waterflood additive.

It is pointed out that difficulties are sometimes encountered in the formation of the aqueous mixture due to the solubility characterisitics of the anionic waterflood additive. When such solubility problems are detected, one can add an effective amount of any suitable water-soluble solubilizing agent to promote solubility. The amount of water-soluble solubilizing agent required in such instances will vary widely, but will generally be within the range of about 0.5 to about 25 wt. % based on the weight of the total additive. Examples of some suitable water-soluble solubilizing agents include: aryl sulfonates such as sodium benzene sulfonate, sodium xylene sulfonate, sodium toluene sulfonates, sodium hexylbenzene sulfonates, sodium octylbenzene sulfonates, and the like; alcohols such as methanol, ethanol, 2-propanols and the like; alcohol ethoxylates wherein the molecule contains about 30 to about 90 wt. % of ehtylene oxide and the alcohol constituent contains about 2 to about 20 carbon atoms; lower olefin derived sulfonates derived from alkenes such as butenes, pentenes, and the like; and ethoxylated alkylphenols such as octylphenol.

In order to more fully explain the present invention, the following examples are provided. However, it is to be understood that the examples are not intended to function as a limitation on the invention as described and claimed in the application.

The invention as described above is further illustrated by the following examples:

EXAMPLE 1

Two alkylation reaction product fractions [AB-515 and H-380-D], from which the first sulfonate component is derived, were prepared by alkylating benzene with a propylene tetramer dimerization reaction product.

The propylene tetramer dimerization reaction product may be prepared by the following procedure:

| (a) | Conditions for maximum conversion: | |
|---|---|---|
| | Sludge/Dodecene Ratio | 3.0/1 |
| | Maximum Reaction Temp. | 120°F |
| | Post Stir, Minutes | 60 |
| (b) | Typical Charges: | |
| | Dodecene, pts (wt) | 600 |
| | Recycle Sludge, pts (wt) | 1800 |

The dodecene (propylene tetramer) is charged to a baffled stirred reactor equipped with a dropping funnel. The desired quantity of stock alkylation sludge is weighed and transferred to the dropping funnel, equipped with a silica gel packed breather.

Agitation of the dodecene is started and addition of alkylation sludge is started at an even rate so as to require 30 ± 1 minutes. The reaction mass is maintained at the desired temperature by means of a cold water bath. After all of the sludge is added, the reaction mass is stirred for one hour. At the end of this period, the entire mass is transferred to a 4 liter separatory funnel and allowed to settle for two hours. The crude dimerization reacton product (DP) is separated from the sludge and is generally used as-is to alkylate benzene. The alkylation is carried out using the crude dimerization product (DP) as the alkylating agent in the manner described below:

Reaction Conditions:
Benzene/Dimerization Product (DP)   3/1 by weight
% $AlCl_3$ based on DP              7
% Water based on $AlCl_3$           4
Max. Reaction Temp., °F             100

The required benzene is charged to a reactor equipped with a stirrer. Agitation of the benzene is started and the temperature is adjusted to 85°F. Fifty percent of the sludge from the dimerization reaction is added to the benzene followed by 50 percent of the total required $AlCl_3$ and then 50 percent of the total required water. The dimerization product is fed at an even rate so as to require 30 ± 2 minutes to complete the addition of the entire charge. The reaction mass is maintained at the desired temperature by cooling means. During this time, a portion of the sludge, $AlCl_3$ and water (about 16.7 percent) of the required total of each is charged after one-fourth, one-half, and finally three-fourths of the dimerization is added to the reactor. After addition of the dimerization product stirring is stopped and the reaction mass is allowed to settle followed by decanting of the crude layer from the aluminum chloride sludge. After washing with sulfuric acid and neutralization the crude alkylation reaction product is distilled to separate the voltailes boiling below about 225° F at 20 mm Hg after which a first fraction boiling between 225°F and 390°F at 20 mm Hg was recovered (designated AB-515) with the second fraction being formed by the bottoms mixture (designated H-380-D).

Another alkylation reaction product [N5B] fraction, from which the second sulfonate component is derived, was prepared by alkylating benzene with a partially chlorinated mixture of $C_{10}$ to $C_{12}$ alkanes (4.2% chlorine content) at a mol ratio of about 8/1, benzene to partially chlorinated mixture, at about 65°C in the presence of aluminum chloride (4 wt. %) for about 1.5 hours. After the catalyst sludge was settled and separated, the crude alkylation reaction product was washed and the unreacted materials (principally benzene and nonchlorinted alkanes) were separated. The resulting alkylation reaction product was then subjected to distillation to strip off a fraction consisting primarily of monoalkylbenzene and having an average molecular weight of about 237–238 and the bottoms fraction was recovered for use in preparing the overbased anionic waterflood additive of this invention.

The above three fractions (AB-515, H-380-D and N5B) were combined into a blend having the following proportions: 50 wt. % N5B, 22.2 wt. % H-380-D and 27.8 wt. % AB-515.

A first portion (A) of this blend was sulfonated batchwise in a reactor with an air-$SO_3$ stream at 60°C over a period of about 40 minutes (total of 33 pts by weight $SO_3$ per 100 pts by weight blend). The resulting sulfonic acid product was neutralized with 10% aqueous NaOH. Another portion (B) of this blend was sulfonated by a continuous thin-film technique with an air-$SO_3$ stream at the same conditions as described in the above batchwise sulfonation with the resulting sulfonic acid product being neutralized with 10% aqueous NaOH. Analyses of the products were as follows:

|  | A | B |
|---|---|---|
| wt. % active sulfonate | 33.6 | 34.2 |
| wt. % non-sulfonated oil | 4.5 | 3.5 |
| wt. % sodium sulfate | nil | nil |
| wt. % $H_2O$ | 41.9 | 52.3 |
| ave. equivalent weight* of sodium sulfonate | 371 | 365 |

*combining weight

Overbased anionic waterflood additives of this invention are prepared from the above neutralized sulfonated blends by adding thereto additional NaOH in sufficient quantities to provide 3 to 300 parts by weight NaOH per 100 parts by weight of the neutralized sulfonated blends.

Alternatively, the overbased anionic waterflood additives of this invention may be prepared in situ in the petroliferous formation by injecting an aqueous solution containing 0.5 to 25 wt. % of the neutralized sulfonated blends followed by injection of an aqueous solution of NaOH sufficient to provide 3 to 300 parts by weight NaOH per 100 parts by weight of the neutralized sulfonated blends.

Alternatively, the overbased anionic waterflood additives of this invention may be prepared in situ in the petroliferous formation by injecting an aqueous solution containing 0.5 to 25 wt. % of the neutralized sulfonated blends followed by injection of an aqueous solution of NaOH sufficient to provide 3 to 300 parts by weight NaOH per 100 parts by weight of the neutralized sulfonated blends.

Good tertiary oil recovery may be had employing the above-described overbased anionic waterflood additives.

EXAMPLE 2

An overbased anionic waterflood additive of this invention may be in accordance with the description in Example 1 except that the alkylation reaction product, from which the first sulfonate component is derived, is limited to that fraction boiling between 225°F and 390°F at 20 mm Hg.

EXAMPLE 3

An overbased anionic waterflood additive of the invention may be prepared as described in Example 1 with the addition of about 0.4 part by weight, per part of the combined sulfonate of Example 1, of a high molecular weight synthetically derived hydrocarbon sulfonate having a molecular weight of 400 to 600 with adjustment of the overbasing to the required level.

EXAMPLE 4

A series of runs was conducted to evaluate the oil recovery properties of the overbased anionic waterflood additives of the invention. In each run, 12 × 2 × 2 Berea sandstone cores were evacuated and saturated with a 1% NaCl brine. The brine saturated cores were reduced to irreducible water saturation with Blandol product (a highly refined mineral oil) and then waterflooded to residual oil saturation with the sodium chloride brine solution. The cores were then ready for tertiary oil recovery and the invention was evaluated using an injection technique of first injecting a two percent pore volume slug of an aqueous solution containing the sulfonate components followed by a ten percent pore volume slug of a 1% NaCl brine and then a two percent pore volume slug of overbasing 4% aqueous NaOH. Tertiary waterflooding was then conducted at 40 cc of brine per hour, a flow rate equivalent to 6–7 feet per day of reservoir flooding, at 130°F until a total of about 1.5 pore volumes of brine were injected.

The combined sulfonate components prepared in Example 1 were used in the evaluation. In some cases, an added amount of a high molecular weight mahogany sulfonate (ave. equivalent weight of 550) was employed and is indicated by BT.

The following table indicates the total sodium sulfonate (combined components), the mahogany sulfonate if used, the weight ratio of the base component to the total sulfonate plus any mahogany sulfonate employed (Ratio), and the volume of oil recovered expressed as a percent of pore volume ($\Delta S$).

TABLE

| Run No. | Sulfonate Employed | Ratio | $\Delta S$ |
|---|---|---|---|
| 1 | 6.7% combined sulfonate of Example 1 (batch sulfonated) | 0.6 | 10.6 |
| 2 | 4.87% combined sulfonate of Example 1 (batch sulfonated) 1.83% BT | 0.6 | 14.9 |
| 3 | 4.29% combined sulfonate of Example 1 (batch sulfonated) 1.31% BT | 0.7 | 18.1 |
| 4 | 4.87% combined sulfonate of Example 1 (thin film sulfonated) 1.83% BT | 0.6 | 15.2 |

Thus having described the invention in detail, it will be understood by those skilled in the art that certain variations and modifications may be made without departing from the spirit and scope of the invention described herein and defined in the appended claims.

We claim:

1. A process for recovering hydrocarbons from a petroliferous formation comprising injecting into the formation an effective amount of an aqueous mixture containing about 0.5 to 25 wt. % of a waterflood additive comprising (a) a base component; (b) a first sulfonate component derived from an alkylation reaction product produced by alkylating an aromatic hydrocarbon with a branched-chain alkene having about 10 to 35 carbon atoms; and (c) a second sulfonate component derived from an alkylation reaction product produced by alkylating an aromatic hydrocarbon with a partially chlorinated normal alkane having about 10 to 18 carbon atoms, said partially chlorinated alkane being prepared by chlorinating said alkane to about 2 to 15 wt. % chlorine content; wherein the base component is present in a weight ratio range of 3/100 to 300/100, base component to total sulfonate of (b) and (c), and wherein the weight ratio of the first sulfonate component to the second sulfonate component is in the range of about 9/1 to 1/9; and waterflooding the formation to recover the displaced hydrocarbons.

2. A process according to claim 1 wherein a high molecular weight oil-soluble sulfonate is added to the sulfonate components of the initial slug in an amount of about 0.2 to 1.0 part by weight per part by weight of the total of the first and second sulfonate components, and the base component is injected in a sufficient amount to provide said weight ratio based on the first and second sulfonate components and the oil-soluble sulfonate.

3. A process for recovering hydrocarbons from a petroliferous formation comprising injecting into the formation a slug of an aqueous mixture containing a first sulfonate component derived from an alkylation reaction product produced by alkylating an aromatic hydrocarbon with a branched-chain alkene having about 10 to 35 carbon atoms; and a second sulfonate component derived from an alkylation reaction product produced by alkylating an aromatic hydrocarbon with a partially chlorinated normal alkane having about 10 to 18 carbon atoms, said partially chlorinated alkane being prepared by chlorinating said alkane to about 2 to 15 wt. % chlorine content; wherein the base component is present in a weight ratio range of 3/100 to 300/100, base component to total sulfonate of (b) and (c), and wherein the weight ratio of the first sulfonate component to the second sulfonate component is in the range of about 9/1 to 1/9; and subsequently injecting a slug of aqueous base component sufficient to provide a weight ratio of base component to the total of the first and second sulfonate components of the previous slug in the range of 3/100 to 300/100; and waterflooding the formation to recover the displaced hydrocarbons.

4. A process according to claim 3 wherein a high molecular weight oil-soluble sulfonate is added to the sulfonate components of the initial slug in an amount of about 0.2 to 1.0 part by weight per part by weight of the total of the first and second sulfonate components, and the base component is injected in a sufficient amount to provide said weight ratio based on the first and second sulfonate components and the oil-soluble sulfonate.

* * * * *